March 21, 1950 V. KLÁSEK 2,501,058
CONNECTION FOR SOLVING THE RELATION
OF SEVERAL VARIABLES
Filed Feb. 17, 1948
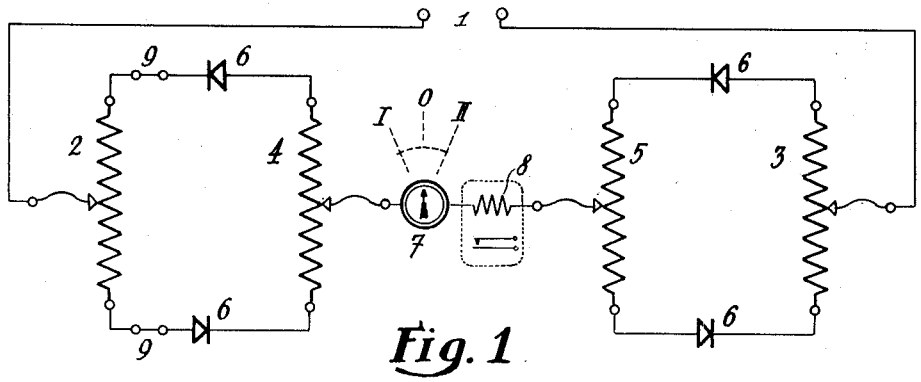
Fig. 1
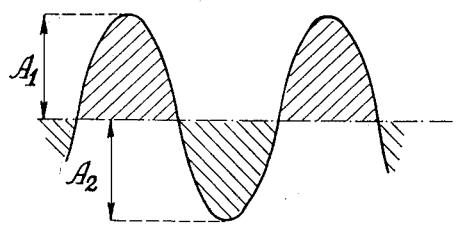
Fig. 2.
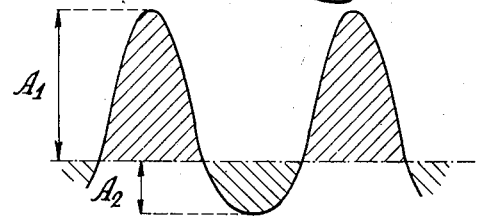
Fig. 3.
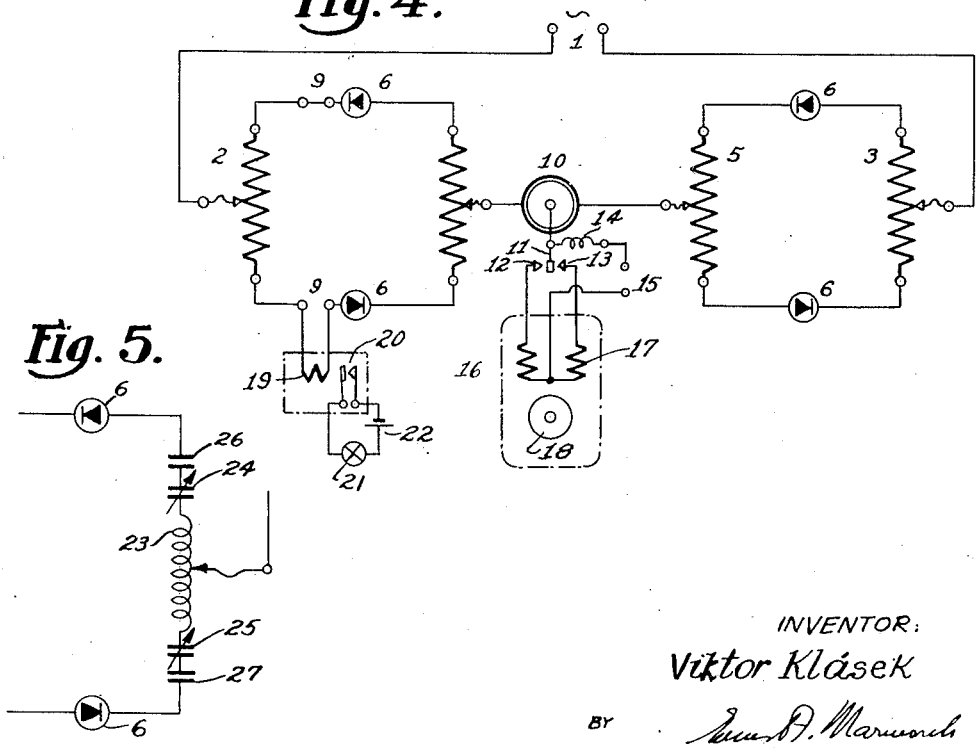
Fig. 4.
Fig. 5.
INVENTOR:
Viktor Klásek
BY
his Agent.

Patented Mar. 21, 1950

2,501,058

UNITED STATES PATENT OFFICE 2,501,058

CONNECTION FOR SOLVING THE RELATION OF SEVERAL VARIABLES

Viktor Klásek, Prague, Czechoslovakia

Application February 17, 1948, Serial No. 8,998
In Czechoslovakia March 13, 1947

8 Claims. (Cl. 235—61)

The invention relates to electric circuits and relates more particularly to circuits for use in connection with the solving of the relationship of several variables.

In the design of devices for automatic control very frequently the necessity arises to solve electrical circuits of several variables in such a way that the motion of the final control element depends on more than one value, for instance the water level control of high pressure boilers of modern design. In this case one control element responds to the changes in the rate of steam flow, the other to the rate of water flow and the third is actuated by variations in the boiler water level. All three elements must be connected either mechanically or electrically to the feed-water control valve which may be either directly operated or relay operated, depending on the service conditions. For solving such relations various electric connections, such as the Wheatstone bridge or its varieties have been used in the past.

The bridge measuring system i. e. the so called zero method embodies however a number of disadvantages. Thus for instance when the supply of the measuring current fails the measuring apparatus remains in the zero position as if the bridge were balanced. The disturbance is therefore not noticeable at all! another disadvantage of the zero measuring method consists in the fact that at the changing spots of the current passage on the resistances connected in series the passing current may vary, at measuring, up to zero. On these spots oxides of resistance metals are formed. These oxides are not linear conductive and their resistance varies at low-voltage values. For this reason varieties of the Wheatstone bridge with constantly loaded passages were used, but these varieties necessitated special measuring instruments such as cross-coil meters etc.

In the drawing,

Fig. 1 is a circuit diagram of an electric circuit in accordance with an embodiment of the invention;

Fig. 2 is a schematic presentation of an alternating current wave showing balanced average value of the positive and negative half-cycles;

Fig. 3 is a schematic diagram similar to Fig. 2 but showing unbalanced average value;

Fig. 4 is a circuit diagram similar to Fig. 1, but embodying a modification; and Fig. 5 is a fragmentary circuit diagram embodying modifications.

All the above named disadvantages have been removed simply by a connection according to this invention of which one example is shown by the diagram, Fig. 1, where the relation of four variable values is solved. When the number of values is smaller, for instance three the fourth one will be replaced by a suitable constant.

The alternating voltage, the size and frequency of which are not decisive for measuring is conducted from the terminals 1 symmetrically to both sides to the sliding contacts of 2 potentiometric resistances 2 and 3. The resistances 2 and 3 are divided by its sliding contacts in such a way that the position of the sliding contacts is proportional to one variable. The current is divided into two branches. Each of these branches is provided with rectifiers 6 or thermionic valves through which only positive or negative half-cycles of the alternating current pass through. These rectifiers 6 are connected against each other in each circuit in such a manner that each of them gives passage to half-cycles of the alternating current in one direction only.

Each of the current branches thus arranged is connected with another potentiometer 4 or 5. Each of these potentiometers 4 or 5 has again a sliding contact. The position of these sliding contacts depends again on the quantity or value of another variable. If one of these values is substituted by a constant, the middle leading-out wire is put precisely into the middle of the respective potentiometer.

Both the movable contacts of the potentiometers 4 and 5 are interconnected and into this connection an electric device, such as the measuring instrument 7, is inserted. This instrument should react only on the difference between the average value of the upper or positive half-cycle and the lower or negative half-cycle. A simple moving coil instrument properly dampened will, therefore, be quite sufficient.

Supposing that the sliding contacts of each potentiometer are mechanically connected to a measuring device, such as a flow-meter or a pressure-gauge, the position of the sliding contacts depends on the measured value. Now the following conditions will arise in the circuit:

For explanation, we assume that the positive half-cycles of the alternating current are flowing in the diagram Fig. 1 from left to right and the negative half-cycles in reverse direction. Through the action of the rectifiers 6 the positive half-cycles are passing through all four lower parts of all the four potentiometers 2, 4, 5 and 3. Proportionally to the amount of the total of the resistances of all these four lower parts the positive half-cycles will attain the amplitude A1, which will also pass through the measuring instrument 7. Similarly the negative half-cycles are, as to their amount, proportional to the total of resistances of all four upper parts of all four potentiometers 3, 5, 4 and 2, the amplitude A2, of these negative half-cycles will pass again through the measuring instruments 7 but of course in the reverse direction. The current conditions at a non-balanced position are shown by Fig. 3, where the positive amplitudes A1 are greater than the negative amplitude A2. The measuring instrument 7 reacting on the differential of the average value of the positive and the negative half-cycles only, it will show, in this case, the positive deviation I, which is proportional to the resulting positive average value differential. At a non-balanced position in an opposite sense (i. e. A2 greater than A1) the measuring instruments 7 will show a negative deviation II.

At the balance position, i. e. when the totals of the resistances in the circuit passing current during the positive cycle of the alternating current are equal to the total of the resistance in the circuit passing current during the negative cycle, conditions as shown by Fig. 2 will arise. Both half-cycles have the same amplitudes $A_1 = A_2$ and therefore the moving-coil instrument does not show any deviation. The pointer of the instrument 7 remains on the zero position "0" although alternating current is passing through. This enables the control of the relation of different measured values in the whole system represented in our circuit by the position of the sliding contacts on the potentiometer. This invention enables also the use of a signal instrument 8 which can be connected into the circuit of the measuring instrument 7. As a signal instrument the electromagnetic relay reacting on cut-off of the alternating current but not reacting on the difference between the amplitude A1 and A2, can be used.

In a similar way instruments can be inserted into the separate branches (e. g. between terminals 9) to signal the undesirable disturbances even in these circuits. The connection according to this invention can be used not only for measuring but also for the regulation of variables. Thus for instance the instrument 7 can be provided with further additional contacts by means of which, upon the deviation to the one or the other side further circuits are closed, controlling the amount of the given value such as the supply of feed water etc.

Both these arrangements are illustrated in Fig. 4. The original connection between the terminals 9 is interconnected and between them is inserted the winding 19 of the electro-magnetic relay; by the influence of the current the contacts 20 are disconnected. In the case of some disturbance the contacts 20 will be connected and also the bulb 21 be energized, for instance from the battery 22.

When the connection according to this invention is used for regulation, then the original measuring instrument 7 will be replaced by a similar instrument 10, which is provided with a conductive pointer 11 instead of a simple pointer; by means of a flexible lead wire 14, the current can flow through this conductive pointer 11 either into the contact 12 or 13. These contacts 12 and 13 are connected with two windings 16 and 17 of a reversible electromotor 18.

The deviation of the pointer 11, for instance to the left, will switch on the contact 12, the winding 16 will obtain current and the motor 18 will revolve in one direction only. Thus—for instance in the aforementioned practical application—the inlet of the feeding-water to the boiler is opened. The reverse deviation of the pointer 11 will cause revolving of the motor 18 in the reverse direction—the inlet of the feeding-water will be closed.

The fundamental idea of this invention refers not only to the use of the ohmic-resistances but also to the inductive and capacity resistances. Under the expression of "potentiometer" given in the patent claims there is to be understood not only the potentiometer composed of ohmic-resistances, but generally of resistances at large, or impedances, i. e. also the inductive and capacity resistances. In the connections according to this invention the combination of such resistances can be used.

Such an inductive and capacitative impedance element is shown in Fig. 5, where condensers 26 and 27, and variable condensers 24 and 25 are shown, connected in series with a coil 23. All three types, namely, inductances, condensers and resistances, alone or in any combination thereof, may be used to form the impedance element or potentiometer hereof, as will be well understood by those skilled in this art.

What I claim is:

1. In an electric circuit, for use in solving the relationship between several variables, in combination, a plurality of endless circuit branches, each branch comprising at least two elements forming a predetermined impedance and connected in series, two current rectifiers unidirectionally connected in series in said branch to restrain the flow of current within said branch to a single direction and each rectifier separated from the other by at least one of said elements, a contact connected to each element intermediate the terminals thereof for dividing, relative to the flow of current, the element into two sections of predetermined impedance ratio, means for selectively varying said ratio to be in proportion with a variable, an electric device, means for interconnecting said device to a contact of two different branches, and means for interconnecting the remaining contacts with a source of alternating current, whereby the current during one half-cycle will flow in a certain direction defined by one-half the number of said rectifiers in a path including the named rectifiers and portions of said elements intermediate the contacts thereof and the named rectifiers, and during the opposite half-cycle will flow in an opposite direction defined by the remaining rectifiers in a second path including said last named rectifiers and the remaining portions of said elements intermediate said contacts and said last named rectifiers, and said current flowing throughout the positive and negative half-cycles through said electrical device, said contacts and said interconnecting means, said device including a movable part and being energizable to move said part from a zero position in response to the differential between the average value of the positive and the negative half-cycles of said current.

2. In an electric circuit, for use in solving the relationship between several variables, in combination, a plurality of endless circuit branches, each branch comprising two elements forming a predetermined impedance and connected in series, two current rectifiers unidirectionally connected in series in said branch to restrain the flow of current within said branch to a single direction and each rectifier separated from the other by at least one of said elements, a contact connected to each element intermediate the terminals thereof for dividing, relative to the flow of current, the element into two sections of predetermined impedance ratio, said contact being movable for selectively varying said ratio to be in proportion with a variable, an electric device, means for interconnecting said device to a contact of two different branches, and means for interconnecting the remaining contacts with a source of alternating current, whereby the current during one half-cycle will flow in a certain direction defined by one-half the number of said rectifiers in a path including the named rectifiers and portions of said elements intermediate the contacts thereof and the named rectifiers, and during the opposite half-cycle will flow in an opposite direction defined by the remaining rectifiers in a second path including said last named rectifiers and the remaining portions of said elements intermediate said contacts and said last named rectifiers, and said current flowing throughout the positive and negative half-cycles through said electrical device, said contacts and said interconnecting means, said device including a movable part and being energizable to move said part in opposite directions from a zero position in response to the differential between the average value of the positive and the negative half-cycles of said current.

3. In an electric circuit for use in solving the relationship between several variables, in combination, a plurality of circuit branches, each branch comprising at least two potentiometers connected in series and a current rectifier interconnected, in series, between each two terminals of the potentiometers to close said branch, and said rectifiers so arranged that current will flow throughout said circuit branch only in a single predetermined direction, a movable contact connected to each potentiometer and selectively adjustable relative thereto to correspond to a variable, an electric device interconnected to a contact of two different of said circuit branches, and means for interconnecting said remaining contacts with a source of alternating current, whereby the current during one half-cycle will flow in a path in a certain direction controlled by some of said rectifiers and including portions of said potentiometers defined by said rectifiers and said contacts, and during the opposite half-cycle flow in a path in an opposite direction controlled by the remaining rectifiers and including the said last named rectifiers and the remaining portions of said potentiometers, and flow throughout the positive and negative half-cycles through said contacts and device, said device including a movable part and being energizable to move said part from a zero position in response to the differential between the average value of the positive and the negative half-cycles of said current.

4. For use in connection with an electric circuit including a source of alternating current and an electrically energizable device, in combination, an endless circuit branch adapted to direct current in a single direction of flow and comprising elements including two potentiometers, two current rectifiers connected between the potentiometer terminals in series and arranged unidirectionally of said direction, and a movable contact connected to each potentiometer and selectively adjustable relative thereto, said device being interconnected to said source and to a contact, whereby current during one half-cycle will flow in a path through predetermined portions of said potentiometers determined by said rectifiers, and during the opposite half-cycle will flow in another path through the remaining potentiometer portions, and throughout its positive and negative half-cycles will flow through said contacts.

5. For use in connection with an electric circuit including a source of alternating current and an electrically energizable device, in combination, an endless circuit branch adapted to direct current in a single direction of flow and comprising elements including two potentiometers, two current rectifiers connected between the potentiometer terminals in series and arranged unidirectionally of said direction, a movable contact connected to each potentiometer and selectively adjustable relative thereto, said device being interconnected to said source and to a contact, and an energizable signal indicator connected to one of said elements and being biased for emitting a signal upon current cut-off, whereby current during one half-cycle will flow in a path through predetermined portions of said potentiometers determined by said rectifier, and during the opposite half-cycle will flow in another path through the remaining potentiometer portions, and throughout its positive and negative half-cycles will flow through said contacts.

6. In an electric circuit, for use in solving the relationship between several variables, in combination, a plurality of endless circuit branches, each branch comprising a plurality of elements, at least one of said elements including an inductance adapted to form a predetermined impedance, said elements being connected in series, two rectifiers unidirectionally connected in series in said branch to restrain the flow of current within said branch to a single direction and each rectifier separated from the other by at least one of said elements, a contact connected to each element intermediate the terminals thereof for dividing, relative to the flow of current, the element into two sections of predetermined impedance ratio, means for selectively varying said ratio to be in proportion with a variable, an electric device, means for interconnecting said device to a contact of two different branches, and means for interconnecting the remaining contacts with a source of alternating current, whereby the current during one half-cycle will flow in a certain direction defined by one-half the number of said rectifiers in a path including the named rectifiers and portions of said elements intermediate the contacts thereof and the named rectifiers, and during the opposite half-cycle will flow in an opposite direction defined by the remaining rectifiers in a second path including said last named rectifiers and the remaining portions of said elements intermediate said contacts and said last named rectifiers, and said current flowing throughout the positive and negative half-cycles through said electrical device, said contacts and said interconnecting means, said device including a movable part and being energizable to move said part from a zero position in response to the differential between the average value of the positive and the negative half-cycles of said current.

7. In an electric circuit, for use in solving the relationship between several variables, in combination, a plurality of endless circuit branches, each branch comprising a plurality of elements, at least one of said elements including a resistance adapted to form a predetermined impedance, said elements being connected in series, two rectifiers unidirectionally connected in series in said branch to restrain the flow of current within said branch to a single direction and each rectifier separated from the other by at least one of said elements, a contact connected to each element intermediate the terminals thereof for dividing, relative to the flow of current, the element into two sections of predetermined impedance ratio, means for selectively varying said ratio to be in proportion with a variable, an electric device, means for interconnecting said device to a contact of two different branches, and means for interconnecting the remaining contacts with a source of alternating current, whereby the current during one half-cycle will flow in a certain direction defined by one-half the number of said rectifiers in a path including the named rectifiers and portions of said elements intermediate the contacts thereof and the named rectifiers, and during the opposite half-cycle will flow in an opposite direction defined by the remaining rectifiers in a second path including said last named rectifiers and the remaining portions of said elements intermediate said contacts and said last named rectifiers, and said current flowing throughout the positive and negative half-cycles through said electrical device, said contacts and said interconnecting means, said device including a movable part and being energizable to move said part from a zero position in response to the differential between the average value of the positive and the negative half-cycles of said current.

8. In an electric circuit, for use in solving the relationship between several variables, in combination, a plurality of endless circuit branches, each branch comprising a plurality of elements, at least one of said elements including a capacitance adapted to form a predetermined impedance, said elements being connected in series, two rectifiers unidirectionally connected in series in said branch to restrain the flow of current within said branch to a single direction and each rectifier separated from the other by at least one of said elements, a contact connected to each element intermediate the terminals thereof for dividing, relative to the flow of current, the element into two sections of predetermined impedance ratio, means for selectively varying said ratio to be in proportion with a variable, an electric device, means for interconnecting said device to a contact of two different branches, and means for interconnecting the remaining contacts with a source of alternating current, whereby the current during one-half-cycle will flow in a certain direction defined by one-half the number of said rectifiers in a path including the named rectifiers and portions of said elements intermediate the contacts thereof and the named rectifiers, and during the opposite half-cycle flow in an opposite direction defined by the remaining rectifiers in a second path including said last named rectifiers and the remaining portions of said elements intermediate said contacts and said last named rectifiers, and said current flowing throughout the positive and negative half-cycles through said electrical device, said contacts and said interconnecting means, said device including a movable part and being energizable to move said part from a zero position in response to the differential between the average value of the positive and the negative half-cycles of said current.

VIKTOR KLÁSEK.

No references cited.